United States Patent
Shimasaku et al.

(10) Patent No.: US 7,021,874 B2
(45) Date of Patent: Apr. 4, 2006

(54) INTERNAL BROACHING MACHINE AND INTERNAL BROACH

(75) Inventors: Katsuyuki Shimasaku, Toyama-ken (JP); Chiaki Uwai, Tokyo (JP)

(73) Assignees: Nachi-Fujikoshi Corp., Toyama-ken (JP); Fuji Heavy Industries, Ltd., Tokyo (JP)

(*) Notice: Subject to any disclaimer, the term of this patent is extended or adjusted under 35 U.S.C. 154(b) by 164 days.

(21) Appl. No.: 10/720,377

(22) Filed: Nov. 25, 2003

(65) Prior Publication Data
US 2004/0165962 A1  Aug. 26, 2004

(30) Foreign Application Priority Data
Feb. 26, 2003 (JP) ............... 2003-049583

(51) Int. Cl.
*B32D 37/10* (2006.01)
(52) U.S. Cl. ............ 409/287; 409/281; 407/13
(58) Field of Classification Search ........... 409/287, 409/281, 282, 275, 269, 257, 261, 270, 244; 407/13; 279/57, 74, 75, 78, 82, 28, 137
See application file for complete search history.

(56) References Cited

U.S. PATENT DOCUMENTS

| 1,901,500 A | * | 3/1933 | Ferris | 409/275 |
| 2,135,157 A | * | 11/1938 | West | 409/287 |
| 2,372,823 A | * | 4/1945 | Gotberg | 409/269 |
| 2,529,705 A | * | 11/1950 | Denes et al. | 409/267 |
| 4,111,586 A | * | 9/1978 | Bistrick et al. | 407/16 |
| 4,859,125 A | * | 8/1989 | Lubiarz | 409/287 |
| 5,252,012 A | * | 10/1993 | Suminski et al. | 409/244 |
| 5,755,539 A | * | 5/1998 | Takeuchi et al. | 409/275 |
| 5,785,470 A | * | 7/1998 | Scheufler | 409/287 |
| 5,833,411 A | * | 11/1998 | Holstein et al. | 409/275 |
| 6,409,442 B1 | * | 6/2002 | Berktold et al. | 409/287 |
| 6,527,484 B1 | * | 3/2003 | Nakamura et al. | 407/13 |
| 2002/0015622 A1 | * | 2/2002 | Nakamura et al. | 407/13 |

FOREIGN PATENT DOCUMENTS

| JP | A-6-126526 | 5/1994 |
| JP | 07001224 A | * 1/1995 |
| JP | 2002137118 A | * 5/2002 |
| JP | 2003165018 A | * 6/2003 |

OTHER PUBLICATIONS

Patent Abstracts of Japan, Publication No. 06-126526.

* cited by examiner

*Primary Examiner*—Boyer D. Ashley
*Assistant Examiner*—Dana Ross
(74) *Attorney, Agent, or Firm*—Venable LLP; Catherine M. Voorhees (57) ABSTRACT

A broach for internal broaching is formed on its pull end and/or follower end with a tapered surface machined with high accuracy. A pull head and/or a retrieving head of a broaching machine, which drivingly grip the pull end and the follower end the broach, is formed with a tapered inner surface complementary to the tapered surface of the broach. The pull head and the retrieving head grip the broach while pressing and clamping their tapered inner surface against the tapered surface, and these heads and the broach are firmly connected together. Clearances or gaps between the heads and the broach are thus eliminated, concentricity between the heads and the broach is significantly improved, and broaching can be performed with high accuracy.

4 Claims, 10 Drawing Sheets

INTERNAL BROACHING MACHINE AND INTERNAL BROACH

BACKGROUND OF THE INVENTION

The present invention generally relates to an internal broaching machine. More specifically, the invention relates to an internal broaching machine which eliminates a gap between a broach and a pull head for gripping a front shank or pull end of the broach and a gap between the broach and a retrieving head for gripping a rear shank or follower end of the broach, thereby improving the accuracy of concentricity of the broach and the heads for a broaching operation.

Figure 13:
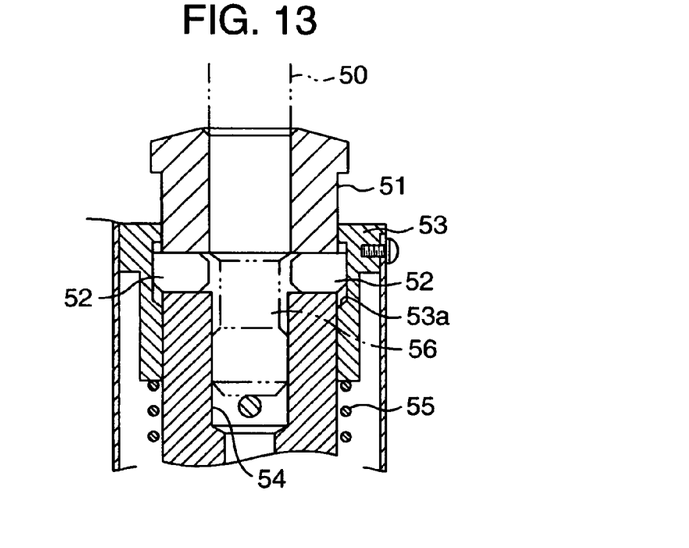
FIG. 13 is a schematic cross-sectional view showing a conventional pull head.

When performing an inner surface broaching using a broach, a pull head has conventionally been used for holding a pull end of the broach, such as shown in JP-A-6-126526. FIG. 13 shows such a pull head. This pull head has a body 51 formed with an insertion hole 54 for a broach pull end 50 and four claw members 52 arranged radially around an axis of the body 51. The claw members 52 can be advanced into the insertion hole 54.

In operation, the broach pull end 50 is inserted into the insertion hole 54 of the pull head. Then, a sleeve 53 mounted on the pull head is slid toward the front end of the body 51, and an inward projecting portion 53a of the sleeve 53 pushes the claw members 52 into abutment against a reduced diameter portion 56 of the broach pull end 50. As a result, the broach pull end 50 is gripped by the claw members 52 in the insertion hole 54 and thus held in the body 51. Reference numeral 55 designates a spring that pushes back the sleeve 53.

In this conventional pull head, when the claw members 52 engage the reduced diameter portion 56 of the broach pull end 50, there is an axial play or gap between the reduced diameter portion 56 and the claw members 52. Further, when the broach is inserted, there is a radial play or gap between the reduced diameter portion 56, the claw members 52 and the inward projecting portion 53a of the sleeve 53. Thus, when the pull head clamps the broach, the broach is loosely movable.

The axial play between the reduced diameter portion 56 and the claw members 52 is removed when the broach pull end 50 is pulled down by the body 51. However, in the above process or during a broaching operation, the broach pull end 50 axially moves or vibrates relative to the body 51, adversely affecting machining accuracy and a life of the broach. With the conventional pull head, therefore, it is not possible to establish correct positioning between the broach and the pull head in the axial and radial directions.

Further, the conventional pull head does not hold the broach pull end 50 in a direction of its rotation.

Figure 14:
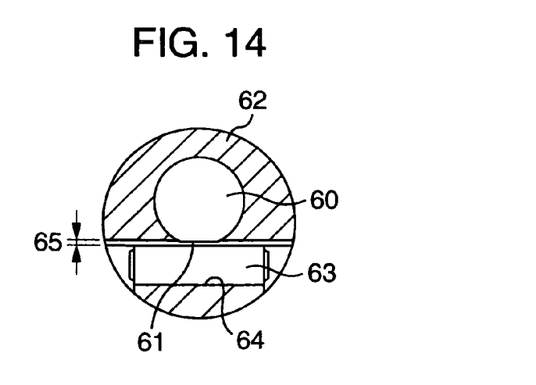
FIG. 14 is a schematic cross-sectional view showing a broach shank rotary direction restriction device in another conventional pull head.

A conventional method for restricting rotary movement of a broach shank involves, as shown in FIG. 14, forming a flat face 61 on a broach pull end 60 and a pin slot 64 in a body 62. After the broach pull end 60 is inserted, a pin 63 is inserted into the pin slot 64 in the body using an appropriate means to prevent rotation of the broach pull end 60. However, since a predetermined tolerance is requied in machining, a clearance 65 in the rotary direction is necessarily formed. As a result, when during a broaching operation the broach pull end 60 is pulled down by the body 62, the broach pull end 60 moves or vibrates in the rotary direction relative to the body 62.

BRIEF SUMMARY OF THE INVENTION

The conventional pull head has plays or gaps between it and a broach in the radial, axial and rotary directions as described above. Thus, during a machining operation, the broach performs cutting, while it follows the accuracy of previous machining on a workpiece in the radial and rotary directions. In the axial direction, the reduced diameter portion of the broach is held in intimate contact with the claw members of the pull head due to a cutting load.

Further, there are also plays and machining tolerance in radial, axial and rotary directions between the broach and the conventional retrieving head for chucking a follower end of the broach. Hence, during processing, the broach is tilted in the radial and rotary directions, as described above and also in the axial or vertical direction, there is a play. The conventional construction thus can not be expected to improve the broaching accuracy and has an adverse effect on the life of the broach.

As described above, with the conventional machine, the broach moves out of its place during a broaching operation and follows the accuracy of previous machining performed on a workpiece before the broaching operation, and correcting cutting by the broach can not be expected.

The invention has an object of providing an internal broaching machine which can significantly improve concentricity between a broach and a pull head or retrieving head by removing a clearance between the pull head for gripping a broach pull end and the broach in an internal broaching operation, or by removing a clearance between the retrieving head for gripping a broach follower end and the broach.

Another object of the invention is to provide a broach, which is for use in the above machine and can eliminate a play or gap between it and the pull head or retrieving head.

To achieve the first object, an internal broaching machine according to the invention comprises a broach having a pull end and a follower end, and a pull head and a retrieving head for respectively gripping the pull end and the follower end of the broach. This machine is characterized in that at least one of the pull end and the follower end of the broach is formed with a tapered surface, that the head for gripping the one broach end is formed with a tapered inner surface complementary to the tapered surface of the broach, and that the tapered surface of the broach is pressed and clamped against the tapered inner surface of the head to firmly connect the head and the broach together.

To achieve the second object, a broach for internal broaching according to the invention comprises a pull end, a follower end, and a tapered surface formed on at least one of the pull end and the follower end and complementary to a tapered inner surface provided in a head of a broaching machine, the head being for drivingly gripping the one broach end.

The tapered surface may be formed on the pull end of the broach, and the complementary tapered inner surface may be formed in the pull head.

The head for gripping the one end of the broach may be the retrieving head. In this case, measures for pressing the broach against the head preferably comprise a push device installed on a slide table for supporting the retrieving head and adapted to press the retrieving head against the broach through the slide table.

The push device may comprise a drive cylinder mounted on the slide table and a movable block movably mounted on the slide table, drivingly connected to the cylinder and adapted to support the retrieving head.

The broach may be formed at both the ends thereof with tapered surfaces, and the heads may be both the pull heads each having pull mechanisms for pulling the broach and be formed with tapered inner surfaces complementary to the corresponding tapered surfaces of the broach. In this case, measures for pressing the broach against the head preferably comprise the pull mechanisms of the pull heads.

The pull mechanism preferably comprises a pair of engagement grooves formed on opposite sides of one of the ends of the broach and each having tapered surfaces on a terminal side of the broach, a pair of radially oriented holes oppositely formed in the pull head, claw members slidably received in the holes respectively, and a sleeve slidably mounted on the pull head and having an inward projecting portion for engaging and pushing the claw members, so that when the sleeve is moved, the projecting portion of the sleeve thrusts the claw members against the tapered surfaces of the broach engagement grooves to pull the broach toward the pull head.

The pull head may further have a rotary direction positioning mechanism. This mechanism preferably comprises a pair of parallel flat faces formed on opposite sides of one of the ends of the broach, a pair of parallel holes radially formed in the pull head, pins slidably received in the holes respectively, and a sleeve slidably mounted on the pull head and having an inward projecting portion for engaging and pushing the pins, so that when the sleeve is moved, the projecting portion of the sleeve thrusts the pins against two ends symmetric with respect to a point of the parallel flat faces of the broach to rotate the broach from opposite directions and thereby clamp the broach with the pull head.

With the internal broaching machine of the invention constructed as above, since the heads and the broach are connected by clamping the tapered surfaces with the tapered inner surfaces, the heads and the broach are firmly coupled together. As a result, plays or gaps between the heads and the broach are eliminated, and broaching can be performed with concentricity between the heads and the broach significantly improved, thereby a highly accurate broaching can be performed.

According to the invention, it is possible to transfer the accuracy of the machine to the cores of the pull head, the retrieving head and the broach and thereby significantly improve machining accuracy of a workpiece compared with that of the previous machining performed before the broaching operation.

The above and other objects, features and advantages of the invention will become apparent from the following description of the embodiments of the invention taken in conjunction with the accompanying drawings.

DETAILED DESCRIPTION OF THE INVENTION

Figure 1:
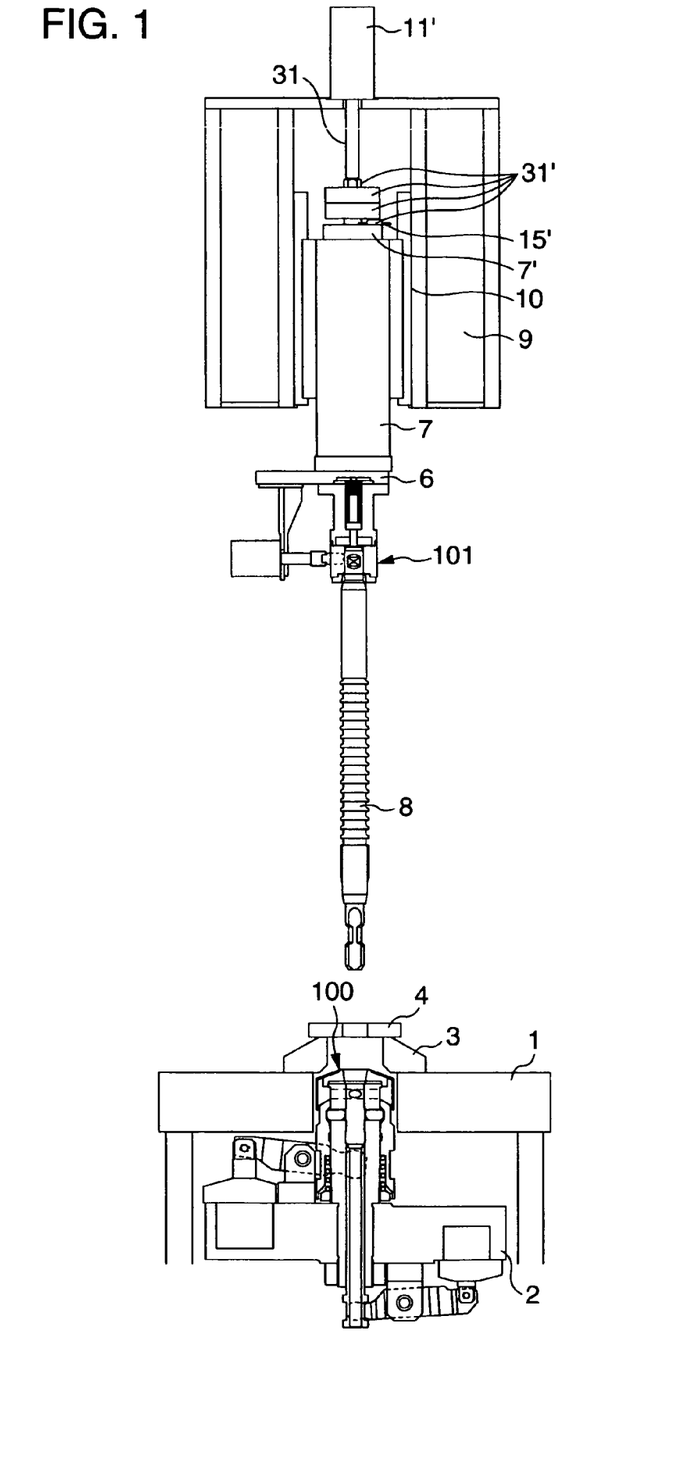
FIG. 1 is a partial cross sectional view showing an essential portion of the internal broaching machine according to an embodiment of the invention which has a pull head for gripping a pull end of a broach and a retrieving head for gripping a broach follower end.

FIG. 1 illustrates an essential portion of the internal broaching machine according to an embodiment of the invention. The machine of this example is a broach-moving, work-fixed type broaching machine.

FIG. 1 shows a pull head 100 for gripping a front shank or pull end of the broach and a retrieving head 101 for gripping a rear shank or follower end of the broach. In this embodiment, the pull head 100 has a two-claw direction determination mechanism using claw members similar to those of the conventional art described above, and the retrieving head 101 is of a pin type.

The broaching machine shown in FIG. 1 is in a state that the pull head 100 is in unclamping, the retrieving head 101 is suspending the broach 8 and a workpiece 4 is placed on an upper surface of a reference jig plate 3. The reference jig plate 3 that receives the workpiece 4 is secured to a column 1 at a front of a machine body.

A slide table 2 for the pull head 100 is arranged vertically movable relative to the column 1, and the pull head 100 is rigidly secured to the pull head slide table 2. The broach 8 is suspended by the retrieving head 101. A retrieving head slide table 9 is arranged vertically movable relative to the column 1, and to this retrieving head slide table 9, a cylinder 11' of a push device is secured, which also serves as a means for pressing the retrieving head against the broach. A rod 31 of the cylinder 11' is connected to a movable block 7, which is vertically guided and moved along a slide portion 10 of the retrieving head slide table 9. Reference numerals 31' and 7' denote connecting members. The retrieving head 101 is fixed to a plate 6 secured to the lower end of the movable block 7.

Although the retrieving head slide table 9 and the pull head slide table 2 are synchronously moved vertically relative to the column 1 during a broaching operation by a motor or cylinder not shown, these two slide tables can be moved vertically independently of each other. The broaching operation cycle progresses in states shown in FIG. 1, FIG. 4, FIG. 6 and FIG. 8.

Figure 2A:
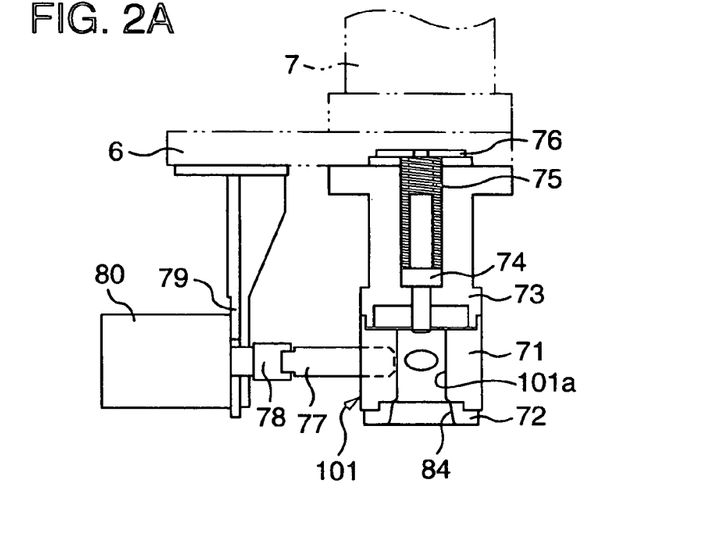
FIG. 2A is a schematic cross-sectional view showing the retrieving head of FIG. 1 in an unclamped state in which the broach is pulled out.
Figure 2B:
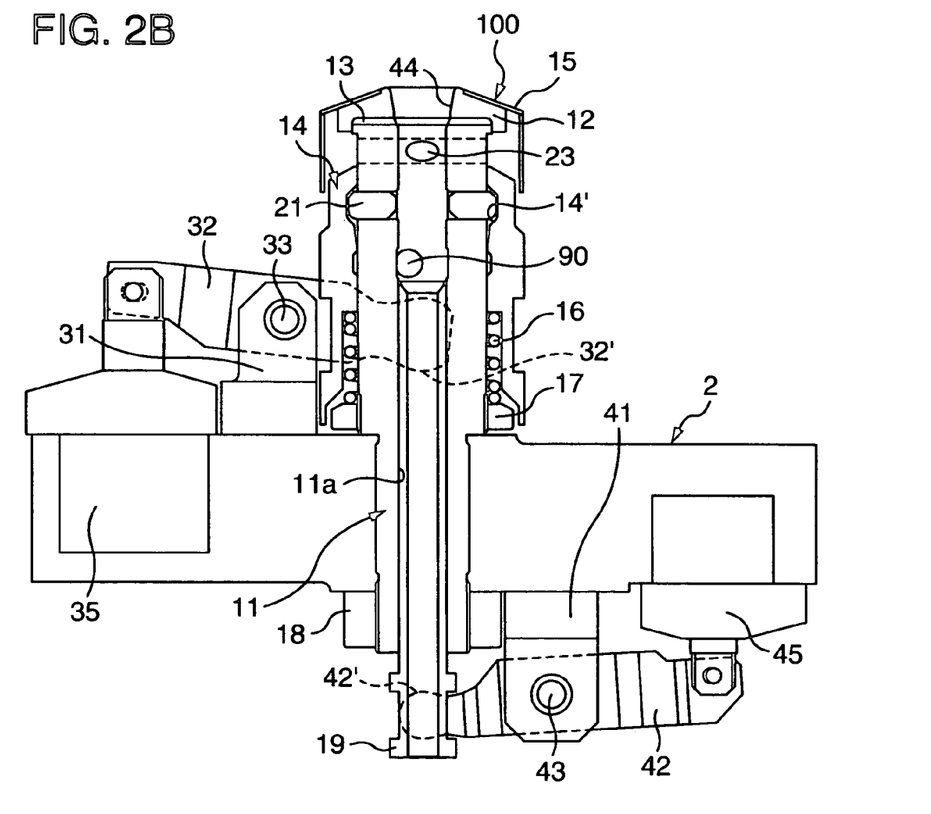
FIG. 2B is a schematic cross-sectional view showing the pull head of FIG. 1 in an unclamped state in which the broach is pulled out.

FIG. 2B shows the pull head 100 in an unclamping state in which the broach is pulled out. A body 11 of the pull head 100 extends through the pull head slide table 2 and is secured to the pull head slide table 2 with a nut 18. The pull head slide table 2 is supported vertically movable on the column 1 via a device not shown. The pull head body 11 has a through-hole 11a, and on the retrieving head body, a sleeve 14 is movably mounted. The sleeve 14 is connected to a slide portion 32' of an arm 32 and is vertically movable relative to the pull head body 11 by driving of the arm 32. The sleeve 14 is pushed away from the pull head slide table 2 by a spring 16, which is retained by a nut 17.

Figure 3A:
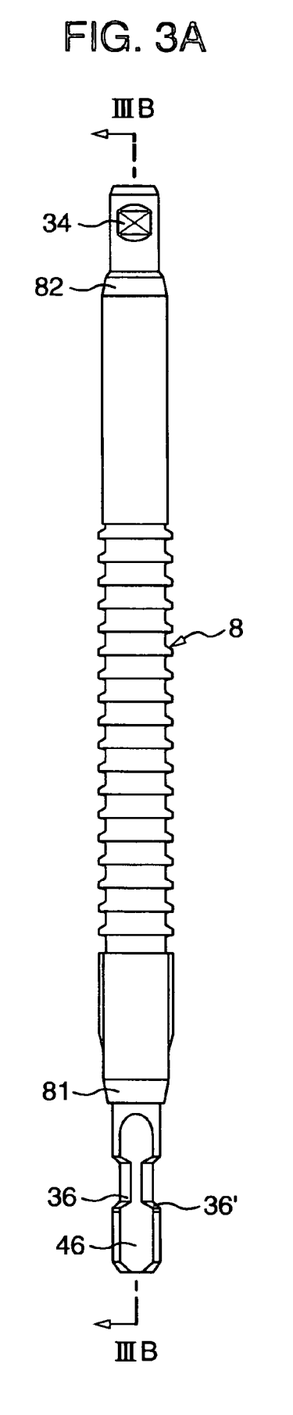
FIG. 3A is a front view showing the broach according to another embodiment of the invention.

A clamp 12 metal is secured to an end of the pull head body 11 along with a vertical adjustment liner 13. The clamp metal 12 has a tapered inner surface 44 shaped like a truncated cone that is complementary to a tapered surface 81 (FIG. 3) machined with high accuracy on the pull end of the broach 8. The pull head 100 clamps the broach 8 by pressing the tapered surface 81 of the pull end of the broach 8 against the tapered inner surface 44 of the clamp metal 12 to firmly connect the broach 8 and the pull head together and thereby eliminate a gap between them. Reference numeral 15 denotes a dust cover.

Figure 6:
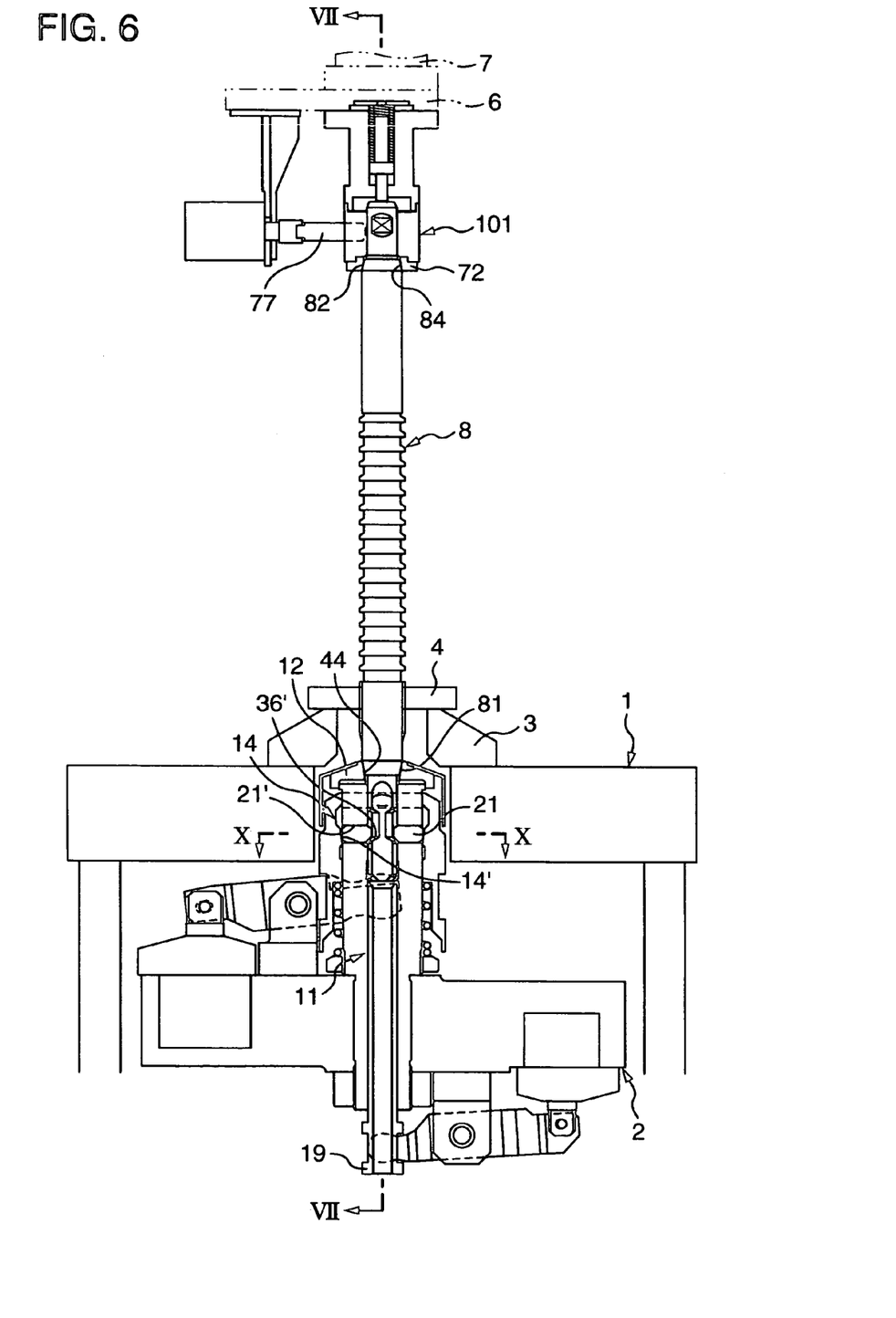
FIG. 6 is a schematic cross-sectional view showing the machine of FIG. 1 with the broach clamped by the pull head and the retrieving head.

The arm 32 is driven by a cylinder 35 through a fulcrum pin 33 and moves the sleeve 14 vertically relative to the pull head body 11 through the slide portion 32' of the arm 32. The slide portion 32' of the arm 32 slidably engages a recessed portion not shown that is provided in an outer circumference of the sleeve 14. As the cylinder 35 lowers, the arm 32 pushes up the sleeve 14, which in turn pushes, through its first inward projecting portions 14', claws 21 of the pull head body into a through-hole in the pull head body. The pull head 100 thus clamps the broach 8 (FIG. 6).

FIG. 2B illustrates the pull head 100 when unclamping. At this time, the sleeve 14 is pushed up by the spring 16 in an unclamping position. A broach pushup shaft 19 slidably inserted in the through-hole 11a of the pull head body 11 is returned to its original position. The broach pushup shaft 19 is used to unclamp the broach 8 from the tapered inner surface 44 of the clamp metal 12 when the broaching operation is completed (a state shown in FIG. 8). The broach pushup shaft 19 engages a slide portion 42' of an arm 42 and is moved vertically relative to the pull head body 11 by the slide portion 42'. The arm 42 is driven by a cylinder 45 through a fulcrum pin 43.

FIG. 2A illustrates the retrieving head 101 in an unclamping state, i.e., when the broach is pulled out. The retrieving head 101 has a body 71 mounted at an end thereof to a bracket 73. The bracket 73 is secured to the retrieving head movable block 7 through a plate 6. The retrieving head body 71 has a through-hole 101a therein, and a clamp metal 72 is provided at the other end of the retrieving head body. The clamp metal 72 has a tapered inner surface 84 of a truncated cone shape that is complementary to a tapered surface 82 (FIG. 3) machined with high accuracy on the follower end of the broach 8.

Figure 12:
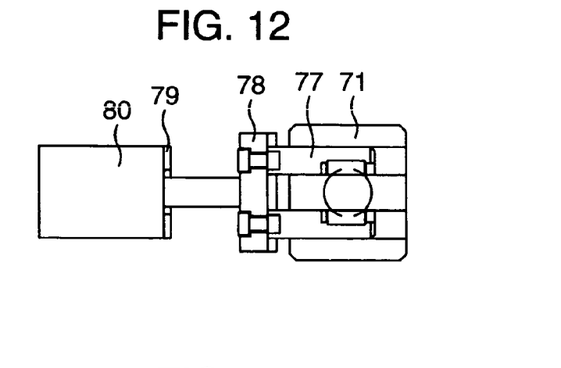
FIG. 12 is a cross-sectional view taken along a line XII—XII in FIG. 4, showing a broach suspending pin portion of the retrieving head.

The retrieving head body 71 is provided with a pair of suspension pins 77 (FIG. 12). The suspension pins 77 are mounted to a rod 78 of a cylinder 80 and are moved horizontally through the retrieving head body 71 by driving of the cylinder 80 to be advanced into and retracted from a through-hole of the body. The cylinder 80 is mounted to a bracket 79 which in turn is secured to the plate 6.

The suspension pins 77, at the position shown in FIG. 2A, are in a state of having been retracted from the through-hole in the retrieving head body by the cylinder 80 and having no interference with the broach 8 which is inserted into the retrieving head body. When suspending the broach 8, the suspension pins 77 are moved into the retrieving head body and hold from both sides cut-out portions 34 formed in the follower end of the broach 8.

When broaching is carried out, the suspension pins 77 are retracted, as shown in FIG. 2A, into a state of having no interference with the broach 8. At this time, a broach retainer pin 74 provided vertically movable in the bracket 73 pushes the broach 8 downward by the force of a spring 75.

In the broaching operation, the retrieving head slide table 9 is lowered to a position where the retrieving head 101 bears on the broach 8. At the position in FIG. 6, the retrieving head 101 secured to the lower end of the retrieving head movable block 7 bears down on the broach 8 by the force of the cylinder 11' provided on the retrieving head slide table 9. By pushing the retrieving head 101 down by the cylinder 11', the clamp metal 72 of the retrieving head clamps the broach 8 (FIG. 6). The spring 75 is secured to a plate 76.

As described above, with the tapered surface 82 of the broach 8 pressed against the tapered inner surface 84 of the retrieving head body 71, the cylinder 11' pushes the retrieving head 101 downward for clamping (FIG. 6). This prevents the broach 8 from deflecting or slanting, and provides the inner broaching machine that can perform broaching with the concentricity between the broach and the retrieving head significantly improved.

Figure 3B:
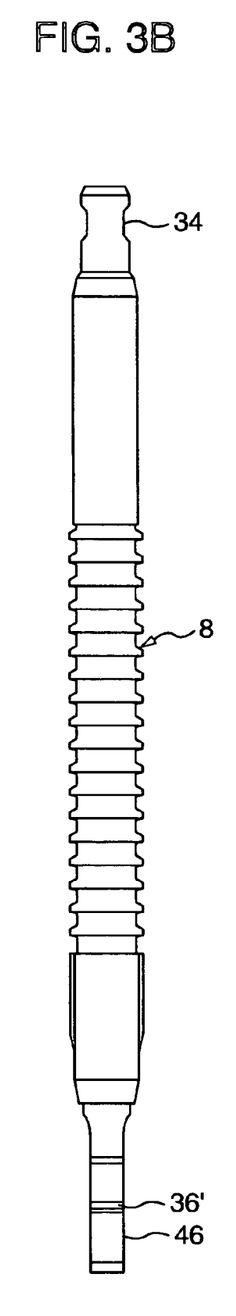
FIG. 3B is a righgt side view of the broach as viewed from a line III B—III B direction in FIG. 3A.
Figure 11A:
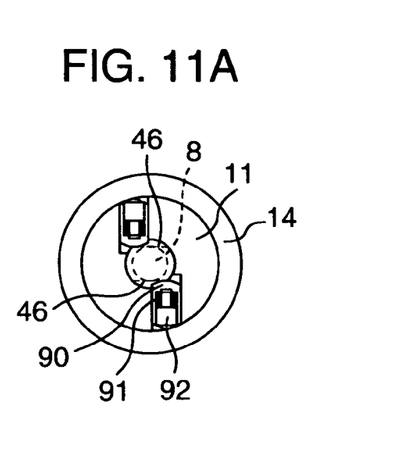
FIG. 11A is a cross-sectional view taken along a line XI—XI in FIG. 7, showing a broach rotary direction positioning mechanism of the pull head in a state of clamping the broach.

FIG. 3 shows the broach according to another embodiment of the invention, which is for use in the machine of FIG. 1. The broach 8 has on its front shank or pull end a truncated cone-shaped tapered surface 81 machined with high precision which is complementary to the tapered inner surface 44 of the clamp metal 12 of the pull head 100 and, on its rear shank or follower end, a truncated cone-shaped tapered surface 82 machined with high precision which is complementary to the tapered surface 84 of the clamp metal 72 of the retrieving head 101. The broach 8 is further formed with parallel-faced portions 46 on the pull end for positioning in a rotary direction (FIG. 11).

The broach 8 is clamped with the tapered surface 81 of the pull end pressed against the tapered inner surface 44 of the clamp metal 12 of the pull head 100. Thus, the broach 8 is firmly united with the pull head 100, and a gap or play between them is eliminated. Further, with the tapered surface 82 of the follower end of the broach 8 pressed against the tapered inner surface 84 of the clamp metal 72 of the retrieving head 101, the broach 8 is pushed down and clamped by the froce of the cylinder 11' of the retrieving head slide table 9. This provides the internal broach 8 that can be prevented from deflecting or slanting and can carry out broaching with the concentricity between the broach and the retrieving head significantly improved.

Figure 4:
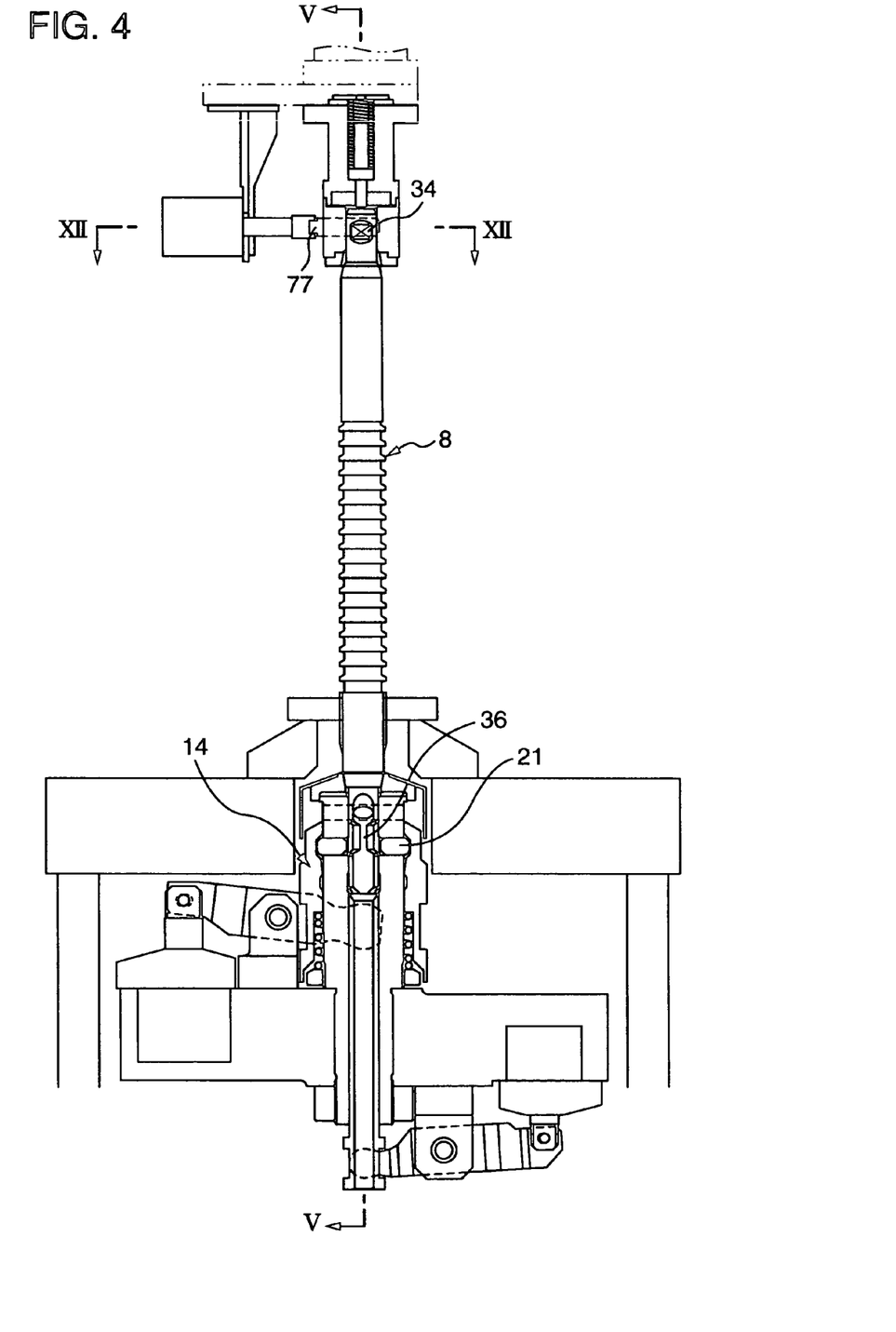
FIG. 4 is a schematic cross-sectional view showing the machine of FIG. 1 in a state that the broach suspended from the retrieving head is lowered and inserted into the pull head.
Figure 5:
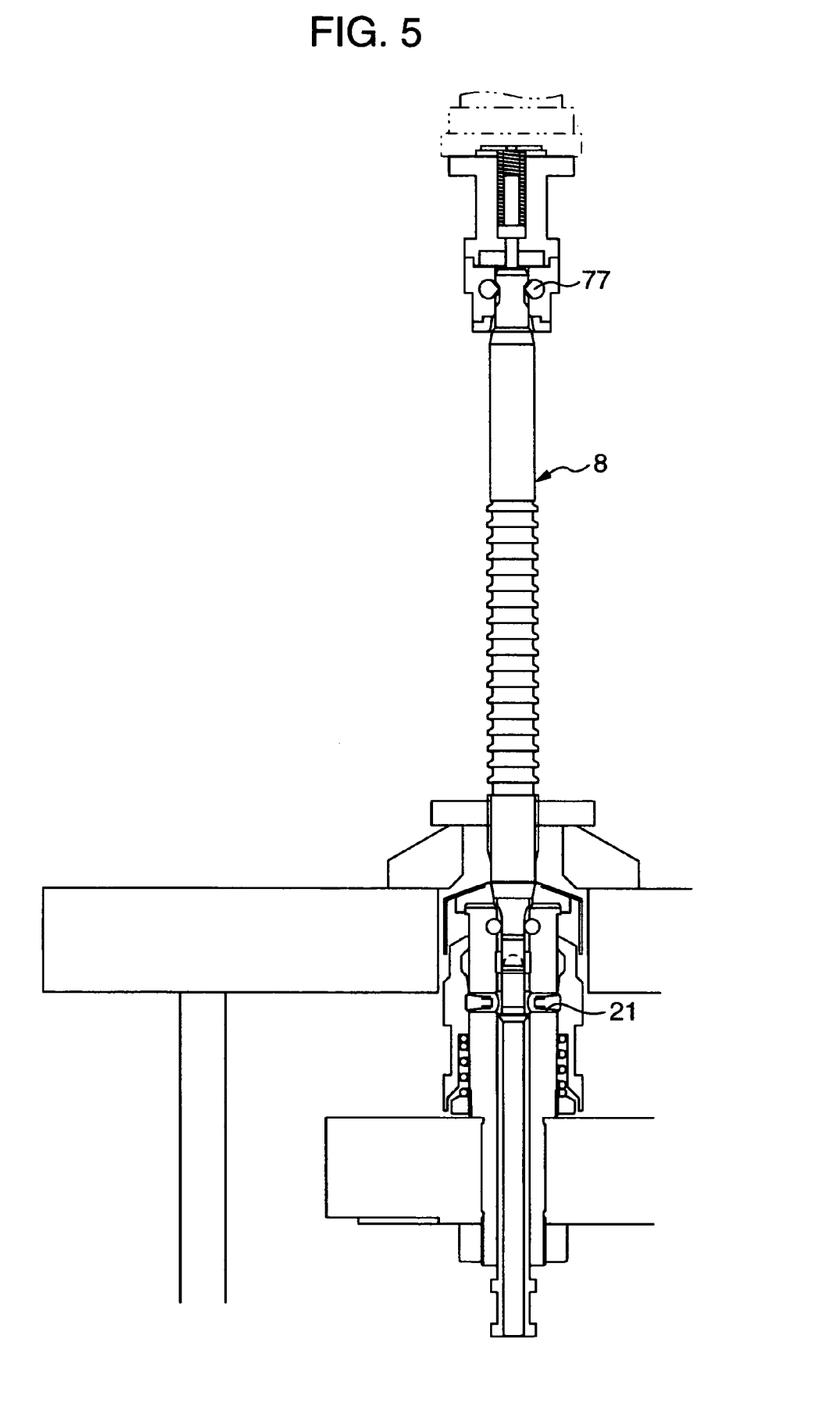
FIG. 5 is a cross-sectional view of the machine taken along a line V—V in FIG. 4.

In FIG. 4, the broach 8 is in a state of having been inserted into the pull head 100 in the state of FIG. 2B through lowering of the retrieving head 101 after being suspended with the cut-out portions 34 of the follower end caught from opposite sides by the suspension pins 77. FIG. 5 is a right side view as viewed in a cross section V—V in FIG. 4. FIG. 12 is an enlarged cross-sectional view of the broach suspension pins of the retrieving head 101, as viewed in a cross section XII—XII in FIG. 4 (when suspending the broach). The suspension pins 77 are provided horizontally movably into the retrieving head body 71.

Figure 7:
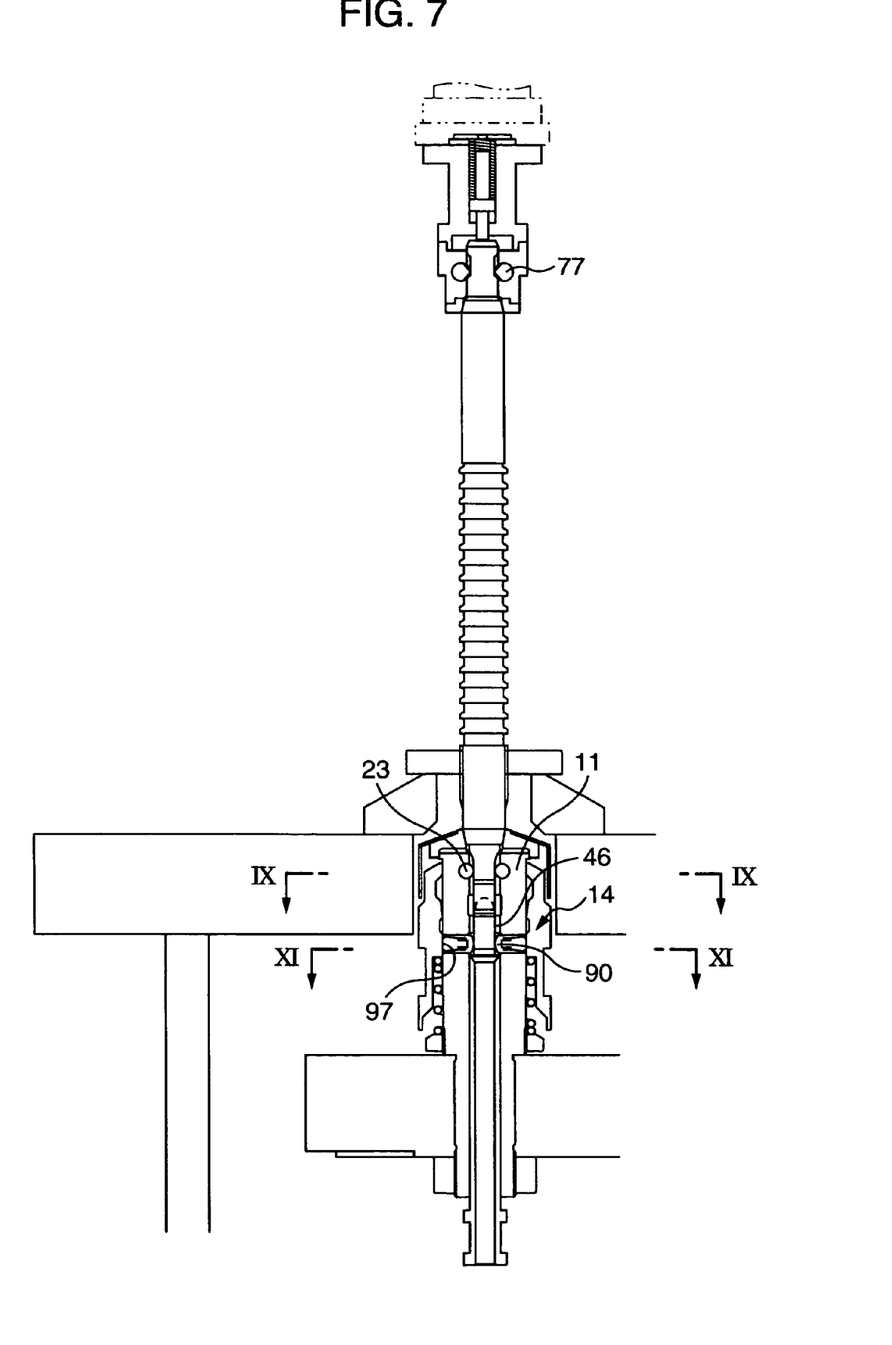
FIG. 7 is a cross-sectional view of the machine of FIG. 6 taken along a line VII–VII in FIG. 6.

FIG. 6 shows a state that the broach 8 is clamped by the retrieving head 101 and the pull head 100, with its upper and lower tapered surfaces 82, 81 held in intimate contact with the tapered inner surfaces 84, 44 of the retrieving head clamp metal 72 and the pull head clamp 12. The column 1 secured to the front part of the machine body is mounted with the reference jig plate 3 on which the workpiece 4 is placed. In this embodiment, the broaching machine is of a broach moving type, and the pull head slide table 2, on which the pull head 100 is installed, is arranged vertically movably with respect to the column 1. The retrieving head slide table 9 is also arranged vertically movably with respect to the column 1, and the retrieving head 101 is mounted to the plate 6 fixed to the retrieving head movable block 7. FIG. 7 is a right side view as viewed in a cross section VII—VII in FIG. 6.

Figure 10A:
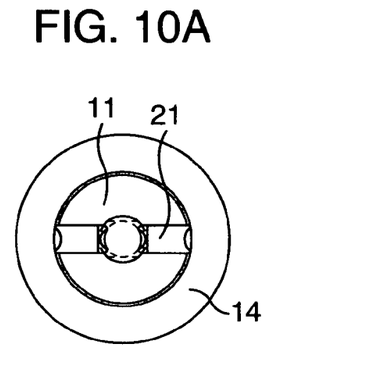
FIG. 10A is a cross-sectional view taken along a line X—X in FIG. 6, showing the pull head in a state of clamping the broach.
Figure 10B:
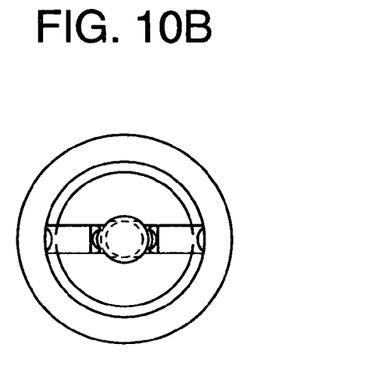
FIG. 10B is a cross-sectional view showing the pull head in a state of unclamping the broach.

FIGS. 10A and 10B show a pull mechanism (serving as a means for pressing the broach to the pull head) of the pull head in clamping and unclamping states as viewed in a cross section X—X in FIG. 6. As can be seen from FIGS. 4 to 7 and FIG. 10, the pull mechanism of the pull head 100 includes two opposing radial holes 21' (FIG. 6) formed in the pull head body 11 and two claws 21 movably received in the corresponding radial holes respectively. The broach 8 is formed with two engagement grooves 36 at corresponding positions in the pull end, each engagement groove having a front tapered surface 36' (FIGS. 3A, 3B).

To clamp the broach 8 with the pull head 100, the pull end of the broach is inserted into the pull head body 11 and then the sleeve 14 on the pull head body is moved up. As the sleeve 14 moves up, the two first projecting portions 14' on the inner surface of the sleeve 14 (FIG. 6) push the associated claws 21 and cause them to protrude radially inwardly. The two claws 21 are pushed against the front tapered surfaces 36' of the engagement grooves 36 of the broach, strongly pulling down the broach 8 (with a stronger force than that pulling down the broach in a broaching operation). Thus, the tapered surface 81 of the broach 8 is pressed and clamped against the tapered inner surface 44 of the pull head 100.

Figure 11B:
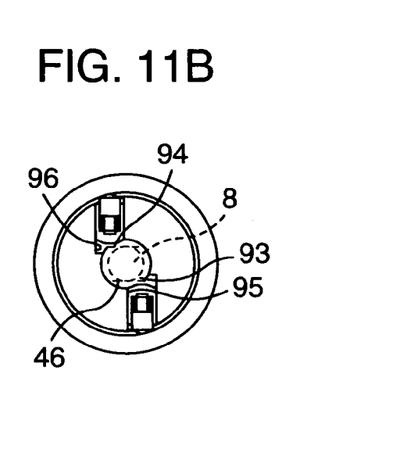
FIG. 11B is a cross-sectional view of the mechanism in a state that the pull head unclamps the broach.

FIGS. 11A and 11B show a rotary direction positioning mechanism in clamping and unclamping states as viewed in a cross section XI—XI in FIG. 7. As can be seen from FIG. 7 and FIGS. 11A and 11B, the rotary direction positioning mechanism includes two parallel holes 95, 96 radially formed in the pull head body 11 and two pins 90 movably received in the respective holes.

When the broach 8 is inserted into the pull head 100, as the sleeve 14 is moved up, two second projecting portions 97 on the inner surface of the sleeve 14 push the pins 90 and cause them to protrude radially inwardly. The two pins 90 are pressed from opposite directions against two ends 93, 94, symmetric with respect to a point, at lower parts of the parallel-faced portions 46 of the broach 8 to rotate the broach 8. This causes the broach 8 to be clamped with the pull head 100 in the rotary direction. Reference numeral 91 denotes a return spring for each pin and reference numeral 92 denotes a return spring retainer.

Figure 9:
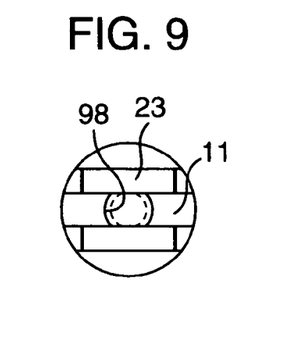
FIG. 9 is a cross-sectional view of that part of the pull head which guides the broach, taken along a line IX—IX in FIG. 7.

FIG. 9 shows a part of the pull head body 11 as viewed in a cross section IX—IX in FIG. 7. In this portion of the pull head body 11, two guide pins 23 are provided parallel to each other, with a hole 98 for broach insertion defined therebetween. The hole 98 is so sized as to provide a clearance between it and the broach. When the broach 8 is inserted into the pull head 100, the pins 23 guide the broach.

Figure 8:
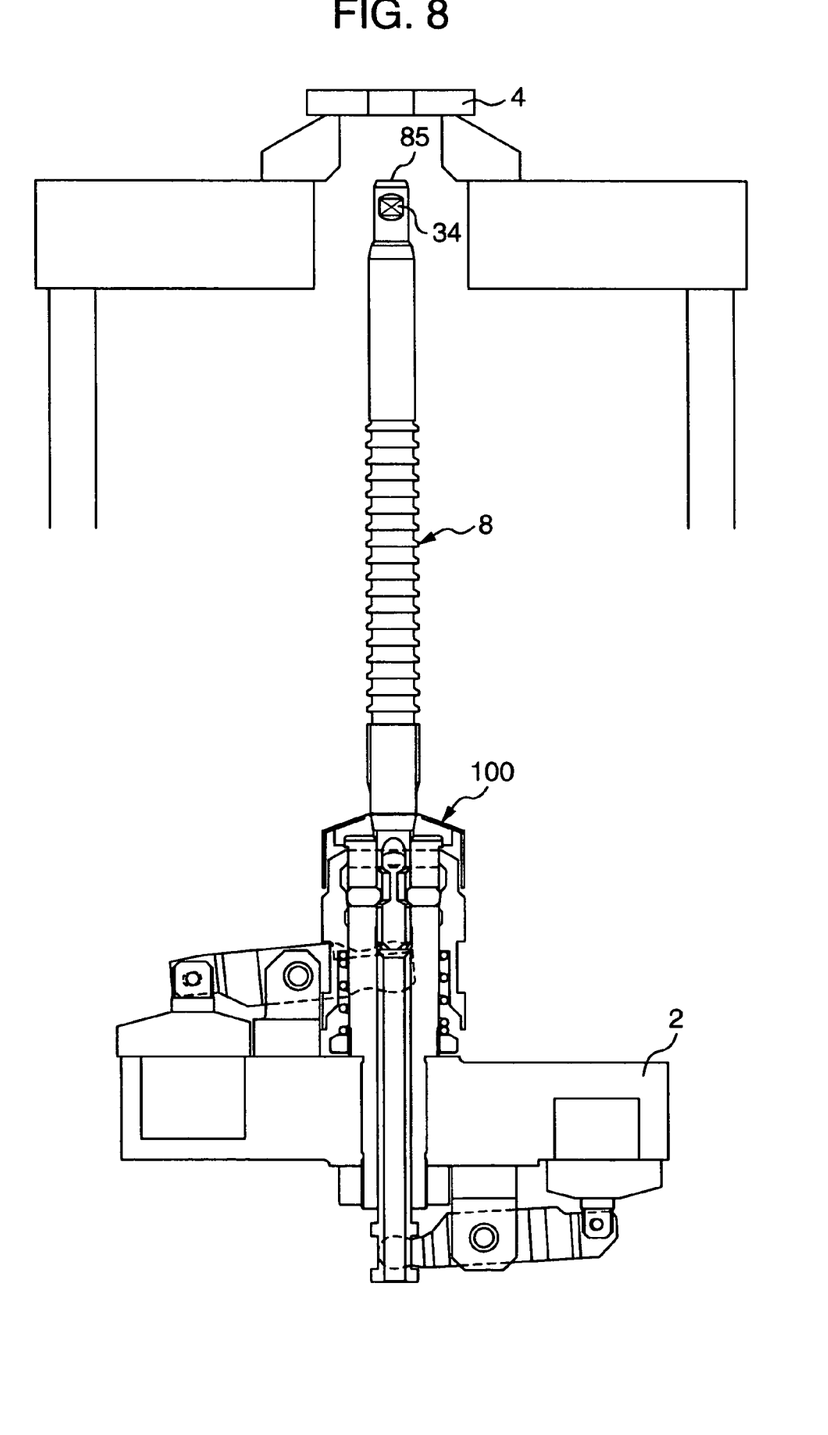
FIG. 8 is a schematic cross-sectional view showing the machine of FIG. 1 in a state that a pull head slide table is moved to a lower end of its stroke and a rear end of the broach is situated below a workpiece when machining is completed.

FIG. 8 shows a state that the internal broaching operation is finished, the pull head slide table 2 is moved to the lowermost position and a rear end 85 of the broach is situated below the workpiece 4. In this state the workpiece 4 is taken out. Then, with the workpiece 4 removed and the pull head 100 clamping the pull end of the broach as shown in FIG. 8, the retrieving head 101 is lowered, the suspension pins 77 catch the engagement grooves 34 of the broach and the broach 8 is returned to the original position shown in FIG. 1. This return cycle progresses in the states shown in FIG. 8, in which the workpiece 4 has been removed, to FIG. 5 to FIG. 1. Internal broaching of workpiece 4 is carried out from the state of FIG. 6 with the broach 8 cutting the workpiece 4 by driving of the pull head slide table 2 and the retrieving head slide table 9 in synchronize with each other, while the tapered surfaces of the broach is held.

The present invention is applicable to an internal broaching machine which performs machining by pulling a broach from both ends to give a tension to the broach. In that case, the broach is formed on its follower end with a tapered surface machined with high accuracy, similarly to the embodiment described above. The head for gripping the follower end of the broach is so constructed as to be able to pull the broach as with the pull head of the above embodiment. The head is also provided with a tapered inner surface that is complementary to the tapered surface on the follower end of the broach. This head bears its tapered inner surface against the tapered surface of the follower end of the broach and pulls the follower end for clamping. In this manner, the broach can be firmly united to and pulled at its both ends by the heads to perform broaching.

The present invention is also applicable to a work-moving, broach-fixed type broaching machine with the similar construction of a broach, a pull head and a retrieving head to that of the broach-moving, work-fixed type broaching machine described above.

It will be further understood by those skilled in the art that the foregoing description has been made on the embodiments of the invention and that various changes and modifications may be made in the invention without departing from the spirit of the invention and the scope of the appended claims.

What is claimed is:

1. An internal broaching machine comprising:
   a broach having a front shank or pull end and a rear shank or follower end, said pull end being formed with a tapered surface and having engagement grooves formed on opposite sides of the pull end;
   a pull head and a retrieving head for respectively gripping said pull end and said follower end, said pull head being formed with a tapered inner surface complementary to said tapered surface of said the pull end;
   means for connecting the broach between the pull and retrieving heads with the tapered surface of the broach pressed against the tapered inner surface of at least one head and firmly connecting the broach with the pull and retrieving heads; and a pull mechanism for pulling the broach toward the pull head, said pull mechanism comprising a pair of radially oriented holes oppositely formed in the pull head, claw members slidably received in the holes respectively, and a sleeve slidably mounted on the pull head and having inward projecting portions for engaging and pushing the claw members, so that when the sleeve is moved, the projecting portion of the sleeve thrusts the claw members against the tapered surfaces of the pull end engagement grooves to pull the broach toward the pull head.

2. An internal broaching machine according to claim 1, further comprising a slide table for supporting said retrieving head, wherein said following end of the broach has a tapered surface formed thereon, said retrieving head also having a tapered inner surface complementary to said tapered surface of the retrieving end of the broach, and said means for clamping the broach comprises a push device provided on said slide table and adapted to press the retrieving head against the broach.

3. An internal broaching machine according to claim 2, wherein said push device comprises a drive cylinder mounted on the slide table and a movable block movably mounted on the slide table, drivingly connected to the cylinder and adapted to support the retrieving head.

4. An internal broaching machine comprising:
a broach having a front shank or pull end and a rear shank or follower end, at least one of said pull end and said follower end being formed with a tapered surface;

a pull head and a retrieving head for respectively gripping said pull end and said follower end, at least one of said pull head and said retrieving head being formed with a tapered inner surface complementary to said tapered surface of said one of the pull end and the follower end; and means for connecting the broach between the pull and retrieving heads with the tapered surface of the broach pressed against the tapered inner surface of at least one head and firmly connecting the broach with the pull and retrieving heads wherein said broach is formed with a pair of parallel flat faces on opposite sides of the pull end and said pull head further comprises a rotary direction positioning mechanism which comprises, a pair of parallel holes radially formed in the pull head, pins slidably received in the holes respectively, and a sleeve slidably mounted on the pull head and having an inward projecting portion for engaging and pushing the pins, so that when the sleeve is moved, the projecting portion of the sleeve thrusts the pins against two ends symmetric with respect to a point of the parallel flat faces of the broach to rotate the broach from opposite directions and thereby clamp the broach with the pull head.

* * * * *